(12) United States Patent
Imafuku

(10) Patent No.: US 7,268,583 B2
(45) Date of Patent: Sep. 11, 2007

(54) RECONFIGURABLE INTEGRATED CIRCUIT DEVICE FOR AUTOMATIC CONSTRUCTION OF INITIALIZATION CIRCUIT

(75) Inventor: Kazuaki Imafuku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 73 days.

(21) Appl. No.: 11/325,410

(22) Filed: Jan. 5, 2006

(65) Prior Publication Data
US 2007/0044065 A1    Feb. 22, 2007

(30) Foreign Application Priority Data
Aug. 17, 2005  (JP) .............................. 2005-236826

(51) Int. Cl.
*H03K 19/173* (2006.01)
(52) U.S. Cl. ............................... 326/38; 326/41; 713/1
(58) Field of Classification Search ............ 326/37–41; 713/1, 2
See application file for complete search history.

(56) References Cited

U.S. PATENT DOCUMENTS 5,844,422 A * 12/1998 Trimberger et al. .......... 326/38
6,851,047 B1 * 2/2005 Fox et al. ...................... 713/1
6,976,160 B1 * 12/2005 Yin et al. ...................... 713/1
7,030,649 B1 * 4/2006 Balasubramanian et al. .. 326/38

FOREIGN PATENT DOCUMENTS

JP    2001-312481    11/2001

* cited by examiner

*Primary Examiner*—Don Le
(74) *Attorney, Agent, or Firm*—Arent Fox LLP

(57) ABSTRACT

A reconfigurable integrated circuit device, in which an arbitrary operating state is constructed based on configuration data, has a reconfigurable circuit unit, having a plurality of reconfigurable processor elements and a processor element network to connect the processor elements in an arbitrary state, and a reconfiguration control portion, which supplies configuration data to the processor elements and processor element network, to construct an arbitrary state in the reconfigurable circuit unit. In response to an external reset cancellation signal at the time power is turned on, at least a portion of the reconfigurable circuit unit is configured in a state of an initialization circuit, and in response to an internal reset cancellation circuit after completion of operation of the initialization circuit, the configuration control portion starts supplying the configuration data.

9 Claims, 9 Drawing Sheets

1. INTEGRATED CIRCUIT DEVICE

_RECONFIGURABLE INTEGRATED CIRCUIT DEVICE FOR AUTOMATIC CONSTRUCTION OF INITIALIZATION CIRCUIT_

CROSS-REFERENCE TO RELATED APPLICATIONS

This application is based upon and claims the benefit of priority from the prior Japanese Patent Application No. 2005-236826, filed on Aug. 17, 2005, the entire contents of which are incorporated herein by reference.

BACKGROUND OF THE INVENTION

1. Field of the Invention

This invention relates to a reconfigurable integrated circuit device, and in particular relates to a reconfigurable integrated circuit device for automatic construction of a circuit for initialization when power is turned on.

2. Description of the Related Art

A reconfigurable integrated circuit device has a plurality of processor elements and a network for connection of the processor elements, and based on configuration data output by a sequencer in response to an external or internal event, processor elements and the network are configured to construct an arbitrary operating state or operational circuit.

A traditional programmable microprocessor of the prior art sequentially reads in order commands stored in memory. Hence the number of commands which can be executed simultaneously by a single microprocessor is limited, and there is a limit to the microprocessor processing capacity.

On the other hand, the above reconfigurable integrated circuit device is provided in advance with a plurality types of processor elements including ALUs having the functions of an adder, multiplier, comparator and similar, delay circuits and counters; and with a network connecting processor elements, and based on configuration data from a state transition control portion comprising a sequencer, the processor elements and network are reconstructed in a desired configuration, and in this operating state prescribed operations are executed. If a plurality of computation circuits are constructed from a plurality of processor elements, these operational circuits can be caused to execute data processing simultaneously. And, when data processing in one operating state is completed, other configuration data can be used to construct another operating state, and in this state different data processing can be performed.

Thus through dynamic reconstruction of different operating states, a reconfigurable integrated circuit device can improve data processing performance for large quantities of data, and can enhance the overall processing efficiency. A reconfigurable integrated circuit device is for example described in Japanese Patent Laid-open No. 2001-312481.

SUMMARY OF THE INVENTION

Ordinary integrated circuit devices execute various types of initialization processing when power is turned on, and after initialization processing ends, the internal reset is canceled and the device enters normal operation. Power-on initialization processing may include, for example, initialization of PLL circuit generating an internal clock synchronized with an external clock, initialization of register being set with various parameters, data initialization and data downloading within memory. In a reconfigurable integrated circuit device also, initialization processing must similarly be performed when power is turned on, and consequently it is necessary to provide a circuit to perform the initialization processing.

However, a circuit to perform the initialization processing would operate only for a fixed period at the time power is turned on, and during normal operation after internal reset is canceled may not be required to operate. Hence the provision of such an initialization processing circuit separately from the reconfigurable circuit results in an undesirable increase in the scale of the circuit.

Hence an object of this invention is to provide a reconfigurable integrated circuit device in which the initialization processing circuit which operates at the time power is turned on is either eliminated, or is of reduced circuit scale.

In order to achieve the above object, according to a first perspective of the invention, a reconfigurable integrated circuit device, in which an arbitrary operating state is constructed based on configuration data, has:

a reconfigurable circuit unit, having a plurality of reconfigurable processor elements and a processor element network to connect the processor elements in an arbitrary state, and a reconfiguration control portion, which supplies configuration data to the processor elements and processor element network, to construct an arbitrary state in the reconfigurable circuit unit;

wherein, in response to an external reset cancellation signal at the time power is turned on, at least a portion of the reconfigurable circuit unit is configured in a state of an initialization circuit, and in response to an internal reset cancellation circuit after completion of operation of the initialization circuit, the configuration control portion starts supplying the configuration data.

According to this first aspect of the invention, at the time power is turned on the reconfigurable circuit unit is configured to be a state of an initialization circuit, the necessary initialization operation is performed by this initialization circuit, and after completion of initialization operation, the reconfigurable circuit unit configures an arbitrary state based on configuration data. Hence by using the reconfigurable circuit unit not used at power-on as an initialization circuit, there is no need for separate provision of an initialization circuit, and the circuit scale of the integrated circuit device can be reduced.

In the above first aspect, according to a preferred aspect, the reconfigurable circuit unit has a configuration register which captures the configuration data in response to a state transition signal from the configuration control portion; based on the configuration data captured by the configuration register, the reconfigurable circuit unit is configured to be an arbitrary state, and in response to the external reset cancellation signal, the configuration register is initialized to initialization configuration data corresponding to the state of initialization circuit in response to the external reset cancellation signal. That is, by means of the external reset cancellation signal at power-on, the configuration register is initialized to the initialization configuration data, so that the reconfigurable circuit unit can be automatically configured to be the initialization circuit.

According to a still more preferred aspect, an initialization counter which counts a prescribed number of the external clocks is constructed, as the initialization circuit, within the reconfigurable circuit unit, and a clock generation circuit which generates an internal clock signal matched with the phase of the external clock signal, and an initialization latch circuit which latches an initialization end signal generated at the end of counting to the prescribed count number by the initialization counter, are provided; the clock generation circuit starts outputting the internal clock in response to the initialization end signal latched by the initialization latch circuit. By this means, an initialization counter is constructed within the reconfigurable circuit unit to count during the period in which the PLL circuit or other internal clock generation circuit is in an unstable state, so that there is no need to provide a separate initialization counter.

By means of this invention, the initialization circuit necessary at power-on can be configured within the reconfigurable circuit unit, so that there is no need to provide a separate initialization circuit. At the time of initialization upon power-on, the reconfigurable circuit unit is not yet utilized, and so the reconfigurable circuit unit can be effectively utilized to configure an initialization circuit.

DESCRIPTION OF THE PREFERRED EMBODIMENTS

Figure 1:
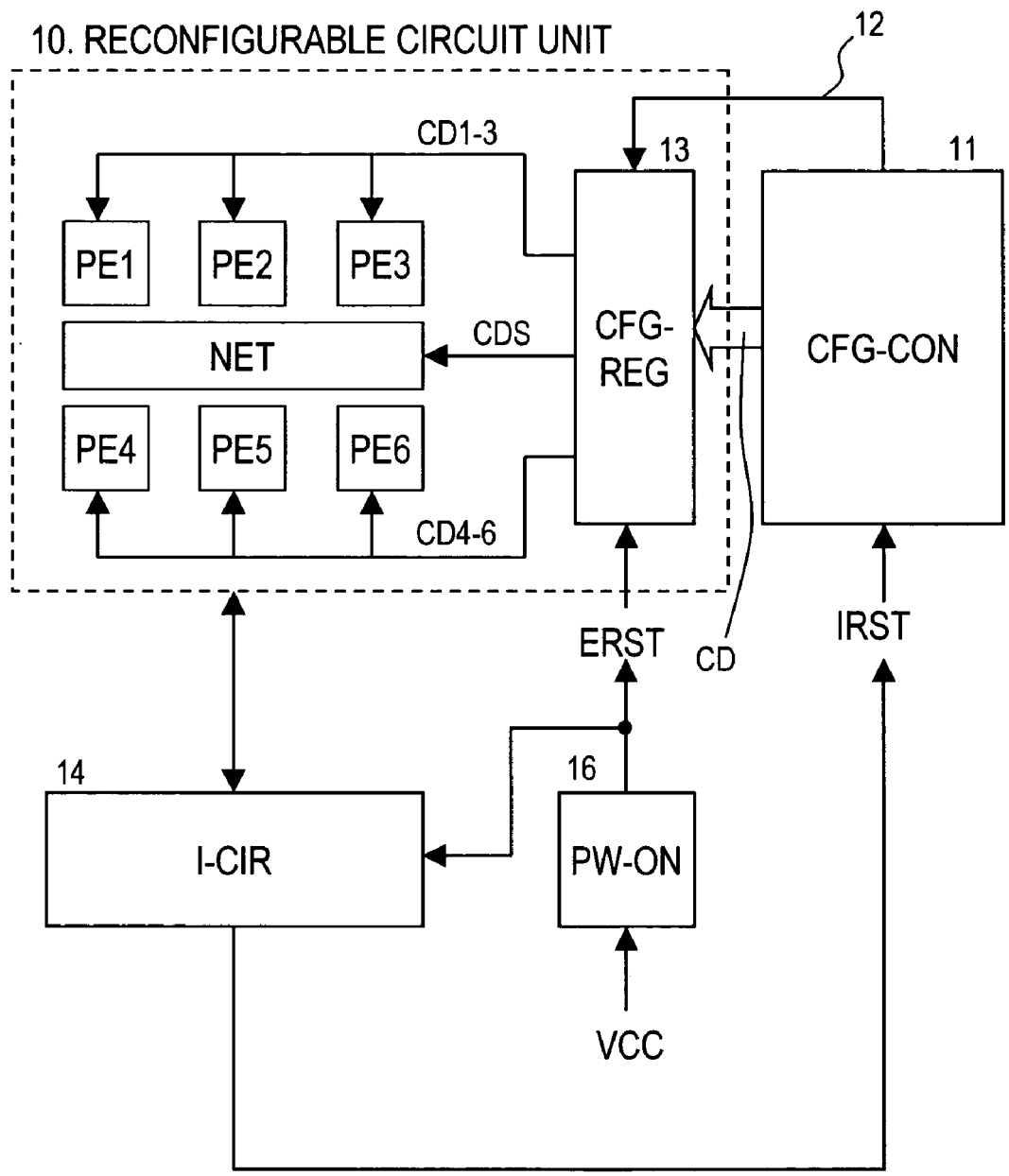
FIG. 1 shows in summary the configuration of the integrated circuit device of an embodiment.

Below, embodiments of the invention are explained referring to the drawings. However, the technical scope of the invention is not limited to these embodiments, but extends to the inventions described in the scope of claims and to inventions equivalent thereto.

FIG. 1 shows in summary the configuration of an integrated circuit device of the embodiment. The integrated circuit device 1 has a reconfigurable circuit unit 10, having a plurality of reconfigurable processor elements PE1 to PE6, a processor element network NET to connect the processor elements in an arbitrary state; and a configuration control portion 11, which supplies configuration data CD to the processor elements PE of the reconfigurable circuit unit and to the network NET, and constructs an arbitrary circuit state in the reconfigurable circuit unit 10. In the configuration control portion 11 are provided a sequencer and configuration memory storing configuration data, not shown; the sequencer reads and outputs desired configuration data from configuration memory, while outputting state transition signals 12 in response to internal and external events.

In the reconfigurable circuit unit 10 is provided a configuration register 13 which latches the configuration data CD in response to a state transition signal 12 from the configuration control portion 11; based on the configuration data CD1-3, CD4-6 latched in the configuration register 13, the internal states of the processor elements PE1 to PE6 are constructed in arbitrary states, and based on the configuration data CDS, an arbitrary connection state is constructed in the network NET. In normal operation after cancellation of the reset state following power-on, the sequencer within the configuration control portion 11 controls state transitions, and outputs in succession the configuration data CD corresponding to the circuit state to be constructed.

Processor elements may be operation processor elements having an internal operational circuit, memory processor elements having internal memory, or similar. An operation processor element has an ALU having an adder, subtracter, multiplier and similar, a fixed-value generation circuit which outputs a prescribed value, an input data processing portion, a comparator, or similar, and is constructed in an arbitrary operational circuit state based on the configuration data. Thus an arbitrary operational circuit state is constructed according to configuration data, and data is processed by the operational circuit, so that configuration data for the processor element PE is a type of processor element command. Configuration data for the processor element network NET is connection information for use in connecting processor elements.

Apart from the reconfigurable circuit unit 10, the integrated circuit device 1 has a fixed internal circuit 14, which is not subjected to reconstruction. The internal circuit 14 transmits and receives prescribed signals to and from an operational circuit constructed within the reconfigurable circuit unit 10, and performs prescribed operation. The integrated circuit device 1 is provided with a power-on reset circuit 16, which detects the input of the power supply VCC from outside and generates an external reset signal ERST. The power-on reset circuit 16 sets the external reset signal ERST at power-on to the reset state (for example, level L), and cancels the external reset signal ERST (for example, setting the signal to H level) after the rise of the power supply VCC. That is, the H-level external reset signal ERST can also be called an external reset cancellation signal.

The external reset cancellation signal ERST generated at time of power-on is a signal instructing the beginning of initialization processing of the internal circuits. In this embodiment, in respect to the external reset cancellation signal ERST, at least a portion of the processor elements PE in the reconfigurable circuit unit 10 and the network NET are constructed to be an initialization circuit. According to the details of one example, the configuration register 13 used to construct the circuit state is initialized with initialization configuration data in response to the external reset cancellation signal ERST. Based on this initialization configuration data, an initialization circuit is constructed in the reconfigurable circuit unit 10.

When prescribed initialization operation ends as a result of operation of the initialization circuit constructed at power-on, an internal reset cancellation signal IRST is output from the internal circuit 14, and in response to this, normal operation of the configuration control portion 11 begins, and the necessary configuration data CD begins to be supplied to the reconfigurable circuit unit 10. By this means, an arbitrary circuit state is constructed within the reconfigurable circuit unit 10. Upon entering the normal operating state, the initialization circuit which had been constructed within the reconfigurable circuit unit 10 loses its reason for existence, and no longer exists. That is, by using the reconfigurable circuit unit, which in the prior art is not used at power-on, to temporarily construct an initialization circuit, initialization operation at power-on becomes possible without separately providing a fixed initialization circuit.

Figure 2:
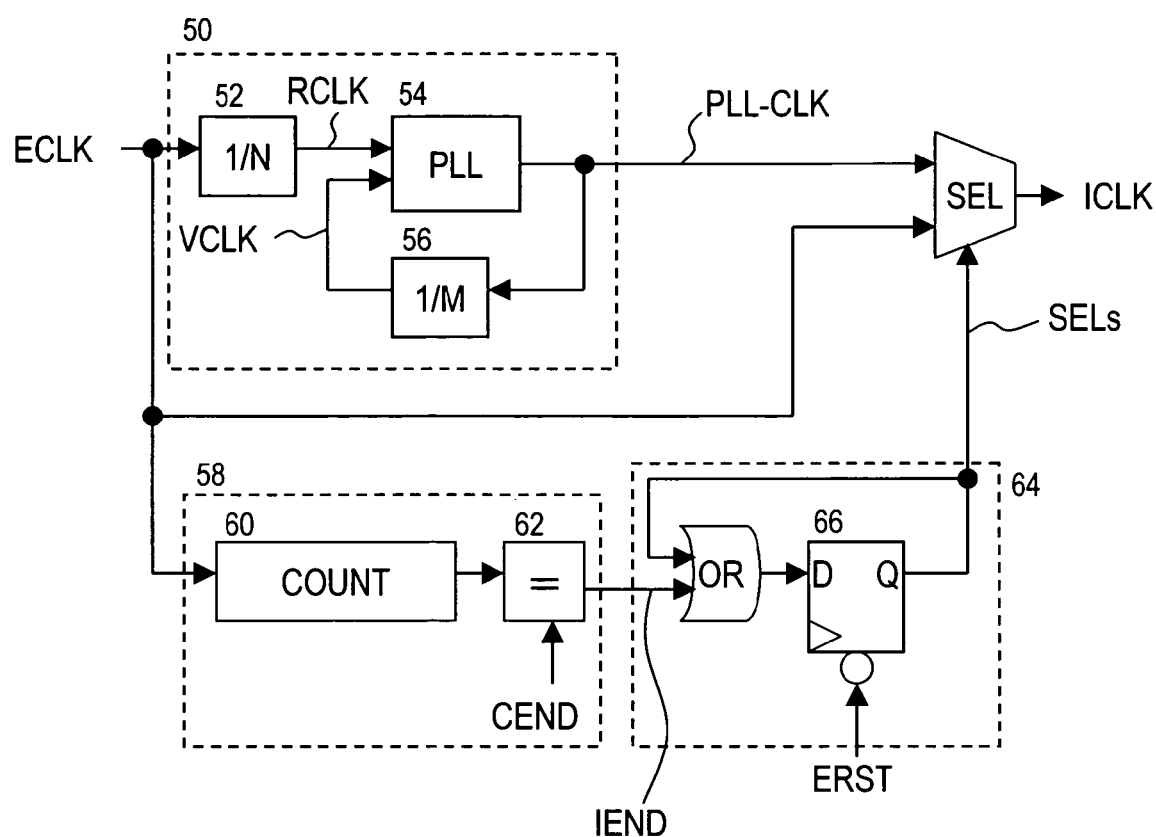
FIG. 2 shows the configuration of a clock generation circuit having one example of an initialization circuit.

FIG. 2 shows the configuration of a clock generation circuit having one example of an initialization circuit. This clock generation circuit is a PLL circuit, and generates an internal clock ICLK phase-matched with the external clock ECLK generated by a quartz oscillator or similar. The PLL circuit unit 50 has a frequency-divider circuit 52 which divides the external clock ECLK by N; and an oscillation unit 54 which includes a VCO which controls the oscillation frequency according to the phase difference between the reference clock RCLK which is the output of the frequency-divider circuit 52 and the variable clock VCLK which is the output of the frequency-divider circuit 56, and generates a clock PLL-CLK with frequency M/N times the external clock ECLK; and a frequency-divider circuit 56 which divides by M the clock PLL-CLK. The selector circuit SEL selects the external clock ECLK at power-on, selects the PLL clock PLL-CLK and outputs the selected clock as the internal clock ICLK after initiation operation in which the output stands by until the PLL clock PLL-CLK stabilizes.

The PLL circuit unit 50 generates a clock PLL-CLK taking as reference the external clock, with phase matching or coinciding with the latter, at a frequency equal to an integral multiple of the external clock frequency; during the initialization operation period at power-on, the state is an unlocked state in which the phases are not yet matched, and in this unlocked state the phase of the clock PLL-CLK is being adjusted and is unstable. Hence the initialization circuit is provided with an initialization counter 58, which measures the unstable period, and an initialization latch circuit 64, which latches the initialization end signal IEND output when counting by the initialization counter 58 ends.

The initialization counter 58 is a stabilization measurement circuit which measures the period until stabilization of the PLL clock PLL-CLK of the PLL circuit unit. The initialization counter 58 has a counter 60 which counts the external clock ECLK, and a coincidence detector 62 which detects coincidence of the counter output with a count completion value CEND.

Further, the initialization latch circuit 64 has an OR gate OR and a flip-flop 66. The output Q from the flip-flop 66 is fed back to the input to the OR gate OR. In this initialization latch circuit 64, the flip-flop 66 is cleared to "0" by an external reset cancellation signal ERST, and in response to a "1" initialization end signal IEND from the initialization counter 58, the flip-flop 66 captures the "1" and latches this state through the feedback loop.

Hence when an initialization end signal IEND occurs the selector selection signal SELs goes to "1", the clock is switched from the external clock ECLK to the generated clock PLL-CLK, and the generated clock PLL-CLK is output as the internal clock ICLK. That is, in the PLL circuit the initialization operation is in standby until the oscillation operation stabilizes after power-on, and after stabilization the PLL clock PLL-CLK is output as the internal clock ICLK.

In this embodiment, the initialization counter 58 necessary for initialization operation in the PLL circuit is temporarily constructed within the reconfigurable circuit unit. On the other hand, even after initialization operation the initialization latch circuit 64 must maintain the selection signal SELs in the state in which the generated clock PLL-CLK is selected, and so must be provided in a fixed manner separate from the reconfigurable circuit unit.

Figure 3:
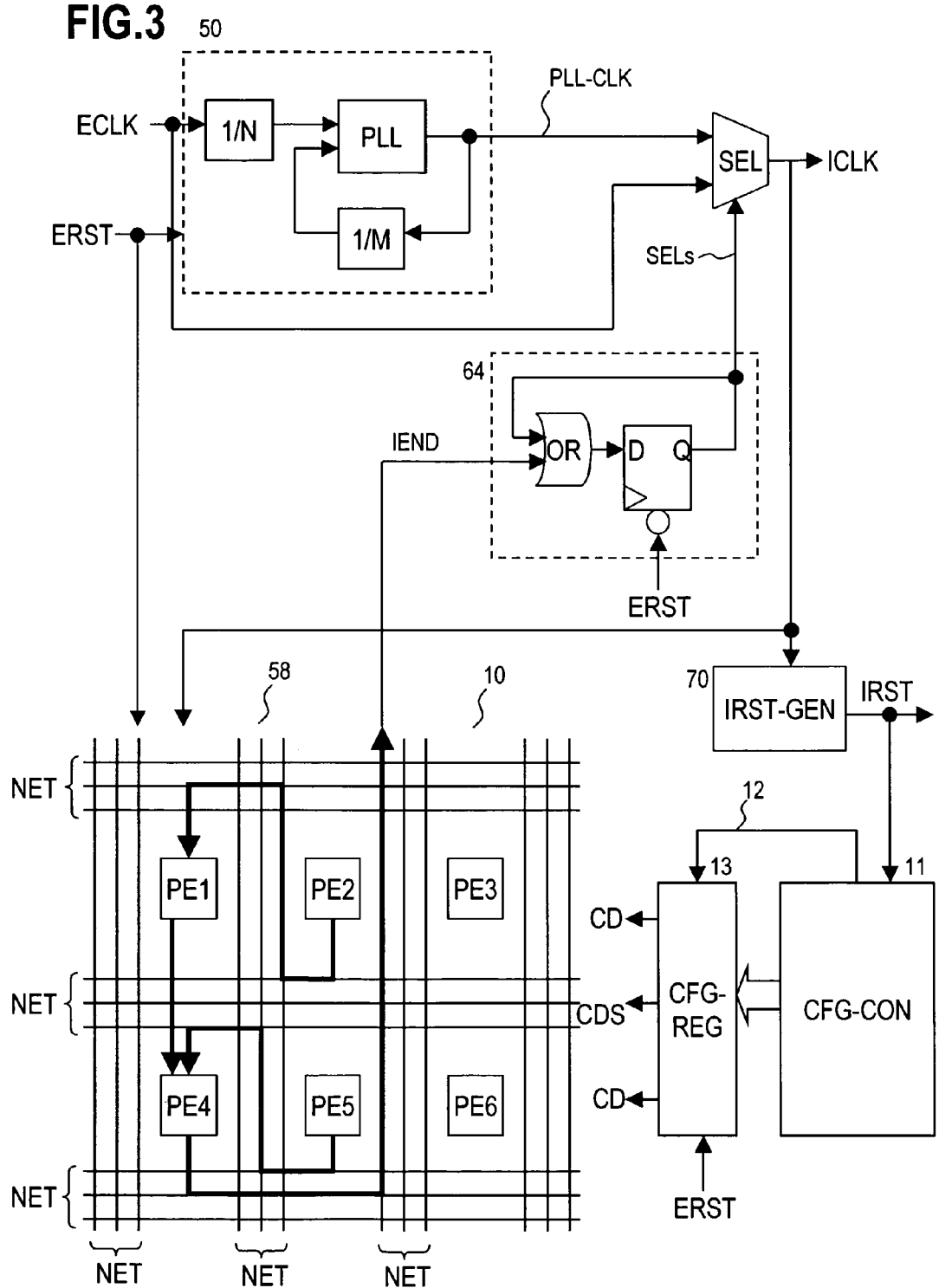
FIG. 3 shows an example of an initialization circuit constructed in an embodiment.

FIG. 3 shows an example of a constructed initialization circuit of the embodiment. In this example, an initialization counter 58 is temporarily constructed within the reconfigurable circuit unit 10 as an initialization circuit necessary for initialization operation of the PLL circuit. Within the PLL circuit, the PLL circuit unit 50 which generates the clock PLL-CLK, the initialization latch circuit 64, and the selector SEL which selects either the external clock ECLK or the generated clock PLL-CLK, are provided in fixed manner, whereas the initialization counter 58 is temporarily constructed from four operation processor elements PE1, 2, 4, 5 and the network NET. As an internal circuit, an internal reset generation circuit 70 which monitors the state of the output ICLK of the selector SEL and generates an internal reset cancellation signal IRST is provided.

Figure 4:
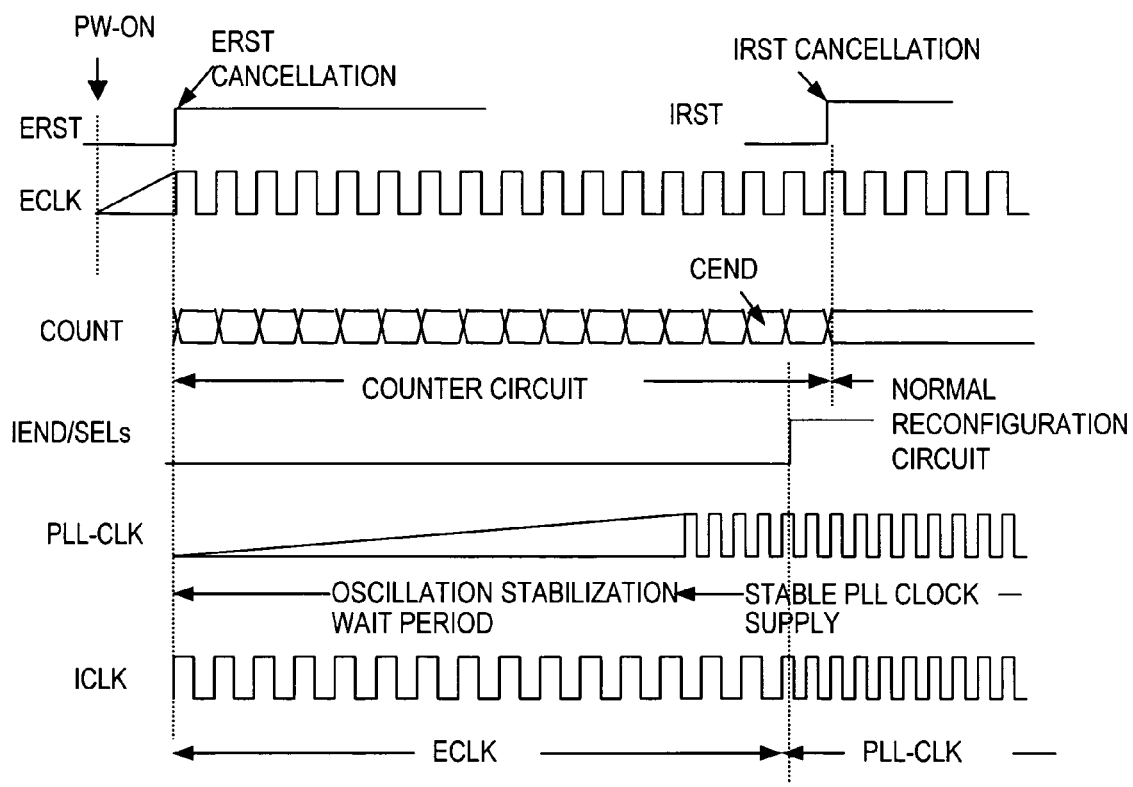
FIG. 4 is a timing chart of initialization operation upon power-on of a PLL circuit.

FIG. 4 is a timing chart of the initialization operation at power-on of the PLL circuit. The operation of the circuit in FIG. 3 is explained referring to this chart. At power-on PW-ON, while the external power supply VCC is rising, the external reset signal ERST is at L level (reset state). When the power supply VCC has risen and the external clock ECLK begins to be supplied normally, the external reset is cancelled (ERST=H). At the initialization state after external reset cancellation, configuration data from the configuration control portion 11 is invalid. In response to the external reset cancellation signal ERST (=H), the configuration register 13 is initialized to the initialization configuration data, and based on this initialization configuration data DC, DCS, an initialization counter 58 is constructed from four operation processor elements PE1, PE2, PE4, PE5 and the network NET.

On the other hand, the PLL circuit unit 50 begins oscillation in response to the external reset cancellation signal ERST. However, immediately after starting, the oscillation is unstable. Hence the selection signal SELs is cleared to L level by the external reset cancellation signal ERST, and the selector SEL selects the external clock ECLK as the internal clock ICLK.

The initialization counter 58 constructed in the initialization state increments the count value COUNT in synchronization with the internal clock ICLK, and upon reaching the count completion value CEND, after oscillation operation of the PLL circuit unit has stabilized, the counter 58 outputs an H-level initialization end signal IEND as the count completion flag. The initialization end signal IEND is latched by the initialization latch circuit 64. The initialization counter 58 may be supplied with the external clock ECLK rather than the internal clock ICLK. This is because at power-on, the internal clock ICLK is equal to the external clock ECLK. However, in the normal state the constructed circuit operates in synchronization with the internal clock ICLK, and so it is desirable that the internal clock ICLK be supplied.

In the state in which the initialization counter circuit has completed counting, the oscillation operation of the PLL circuit unit 50 is already in the phase-locked state, and a stable PLL clock signal PLL-CLK is being generated. As a result of the H level of the selection signal SELs which is the latched output of the initialization latch circuit 64, the selector SEL selects and outputs the PLL clock PLL-CLK as the internal clock ICLK. And, on detecting the change in this internal clock ICLK, the internal reset generation circuit 70 outputs an internal reset cancellation signal IRST, instructing the internal circuit to commence normal operation. For example, the configuration control portion 11, in response to this internal reset cancellation signal IRST, begins to output to the configuration register 13 configuration data CD necessary for circuit construction. In normal operation thereafter, the configuration control portion 11 outputs the configuration data CD together with a state transition signal 12 in response to an event, and dynamically constructs the necessary processing circuitry in the unit 10. In the normal operation state, the initialization counter 58 no longer exists in the unit 10.

Figure 5:
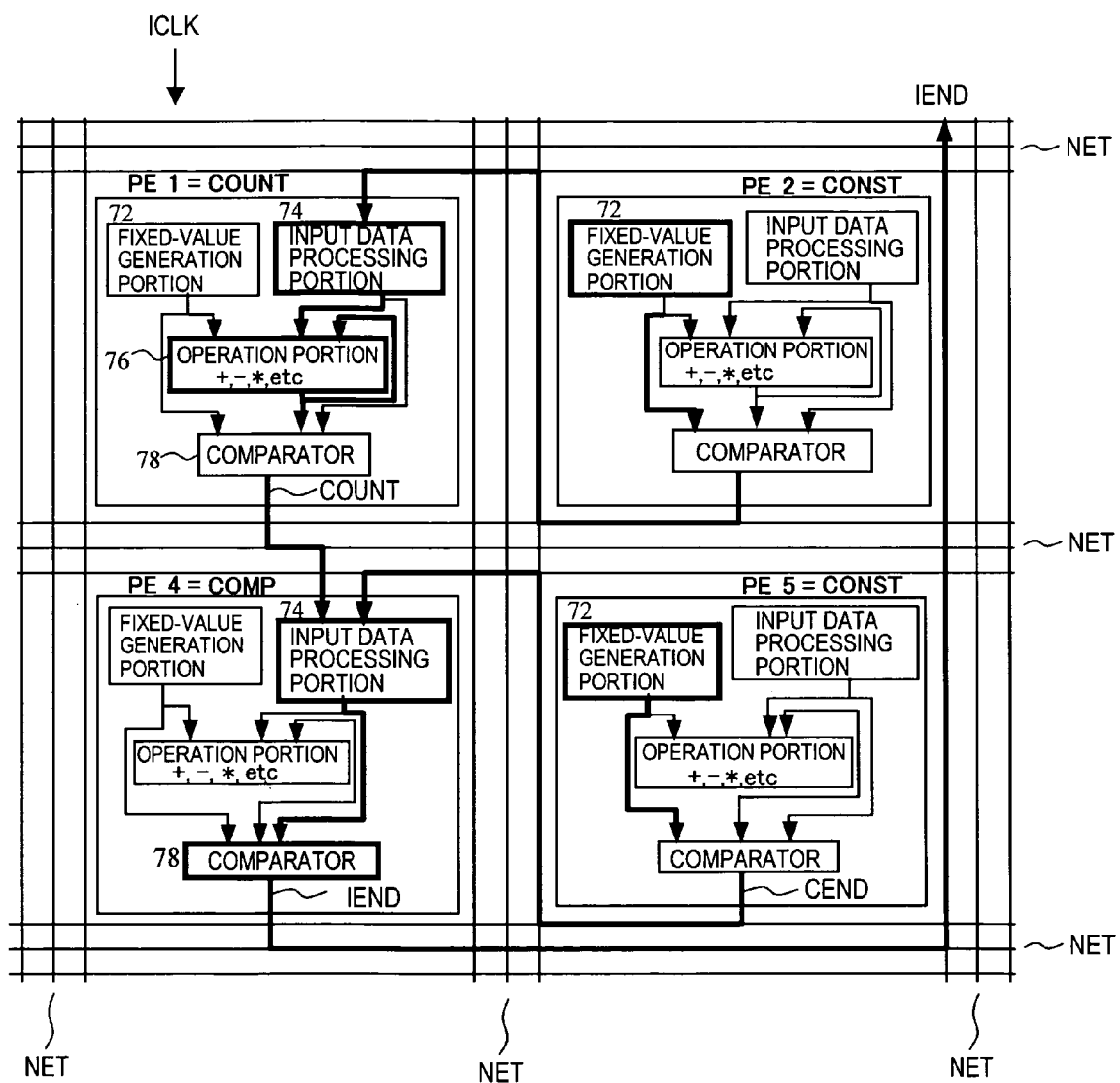
FIG. 5 shows an example of the configuration of an initialization counter constructed temporarily as an initialization circuit in an embodiment.

FIG. 5 shows an example of the configuration of an initialization counter constructed temporarily as an initialization circuit in the embodiment. In this example, the four operation processor elements PE1, 2, 4, 5 are all the same, and internally they are provided with a fixed-value generation portion 72 which outputs a prescribed constant, an input data processing portion 74, an arithmetic unit 76 having functions for addition, subtraction, multiplication and similar, a comparator 78, and similar; and based on configuration data which is operation commands, a circuit state is constructed from the elements. The processor element network NET is positioned between the processor elements PE and has a plurality of selectors, not shown; the selector states are selected based on the configuration data to construct a prescribed connection state.

In the example of FIG. 5, using the input data processing portion 74 and arithmetic unit 76, the processor element PE1 is constructed as a counter 60 (FIG. 2) which adds arguments, supplied to the input data processing portion 74, in synchronization with the internal clock ICLK. The processor element PE2 is constructed, using the fixed-value generation portion 72, as a circuit which generates a counter argument, and the processor element PE5 is constructed using the fixed-value generation portion 72 as a circuit which generates the count completion value CEND. The processor element PE4 is constructed, using the input data processing portion 74 and comparator 78, as a circuit which compares the count value COUNT of the processor element PE1 and the count completion value CEND, and upon coincidence generates an initialization end signal IEND. Two values, COUNT and CEND, are supplied in parallel from the input data processing portion 74 to the comparator 78. The processor element network NET is constructed along the signal paths indicated by bold lines.

Figure 6:
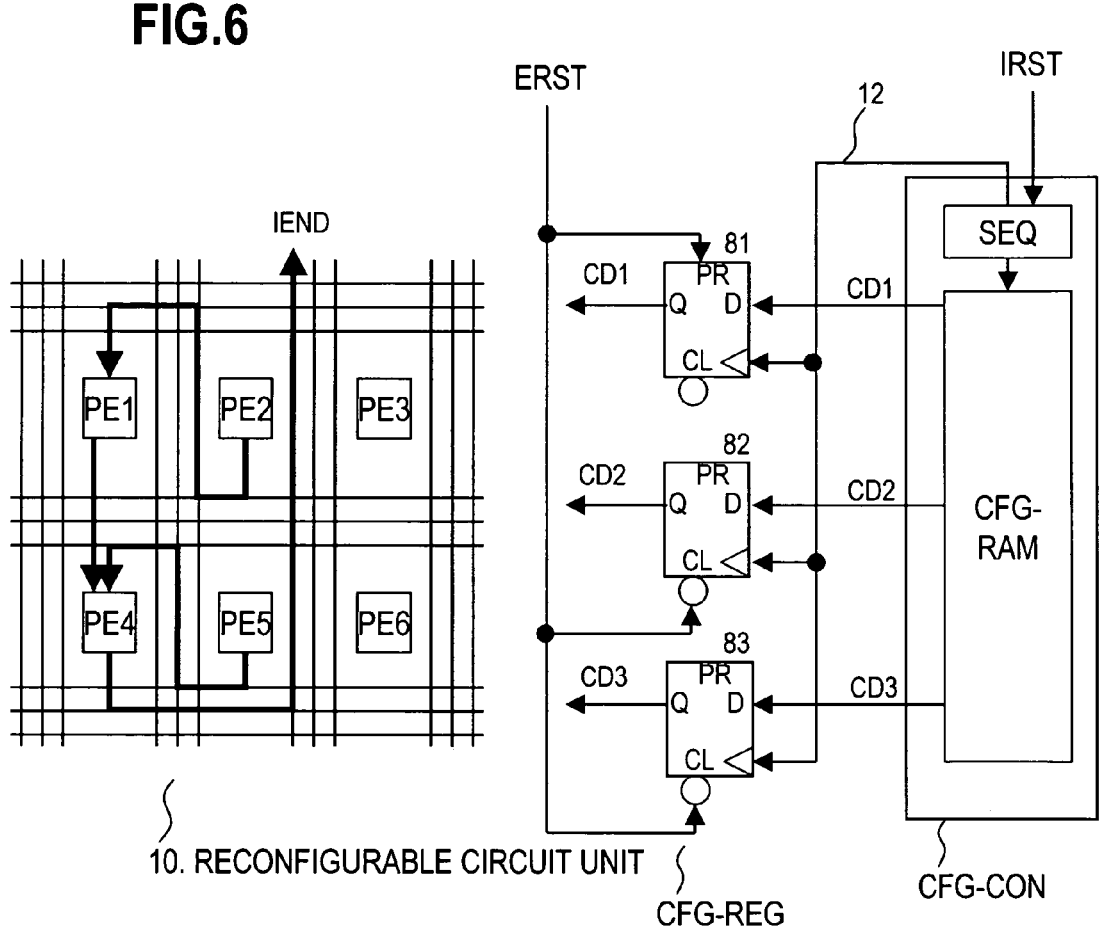
FIG. 6 explains the construction of an initialization circuit in an embodiment.

FIG. 6 explains the construction of the initialization circuit in the embodiment. In FIG. 6, a specific example of the configuration register CFG-REG is shown. The configuration register CFG-REG comprises a plurality of flip-flops 81 to 83. Configuration data CD from configuration memory CFG-RAM within the configuration control portion CFG-CON is input to the data input terminals D of each of the flip-flops, and in response to a state transition signal 12 from the sequencer SEQ supplied to the clock input terminals, the configuration data CD1 to CD3 is latched by the flip-flops. The latched configuration data CD1 to CD3 is supplied to the reconfigurable circuit unit 10 and used to construct the desired circuit state in the unit 10.

Each of the flip-flops 81 to 83 of the configuration register CFG-REG has a clear terminal CL to clear the held data to "0", and a preset terminal PR to set the data to "1". In this aspect, the signal line of the external reset cancellation signal ERST is selectively connected to the clear terminals CL or preset terminals PR of each of the flip-flops 81 to 83. By this means, in response to an external reset cancellation signal ERST (=H), the flip-flop group of the configuration register is automatically initialized to the initialization configuration data. That is, in the example of FIG. 6 the flip-flop 81 is preset to the configuration data CD1 of "1", and the flip-flops 82 and 83 are cleared to the configuration data CD2, CD3 of "0", so as to initialize the flip-flops. By means of this initialization configuration data, the initialization circuit, which in the above example is an initialization counter circuit, is constructed within the reconfigurable circuit unit 10.

After completion of the initialization operation, the internal reset cancellation signal IRST is generated, and in response the sequencer SEQ begins normal operation. In normal operation, as explained above, in response to a state transition signal 12, each of the flip-flops in the configuration register latches the configuration data CD from configuration memory CFG-RAM and supplies the data to the reconfigurable circuit unit 10.

Figure 7:
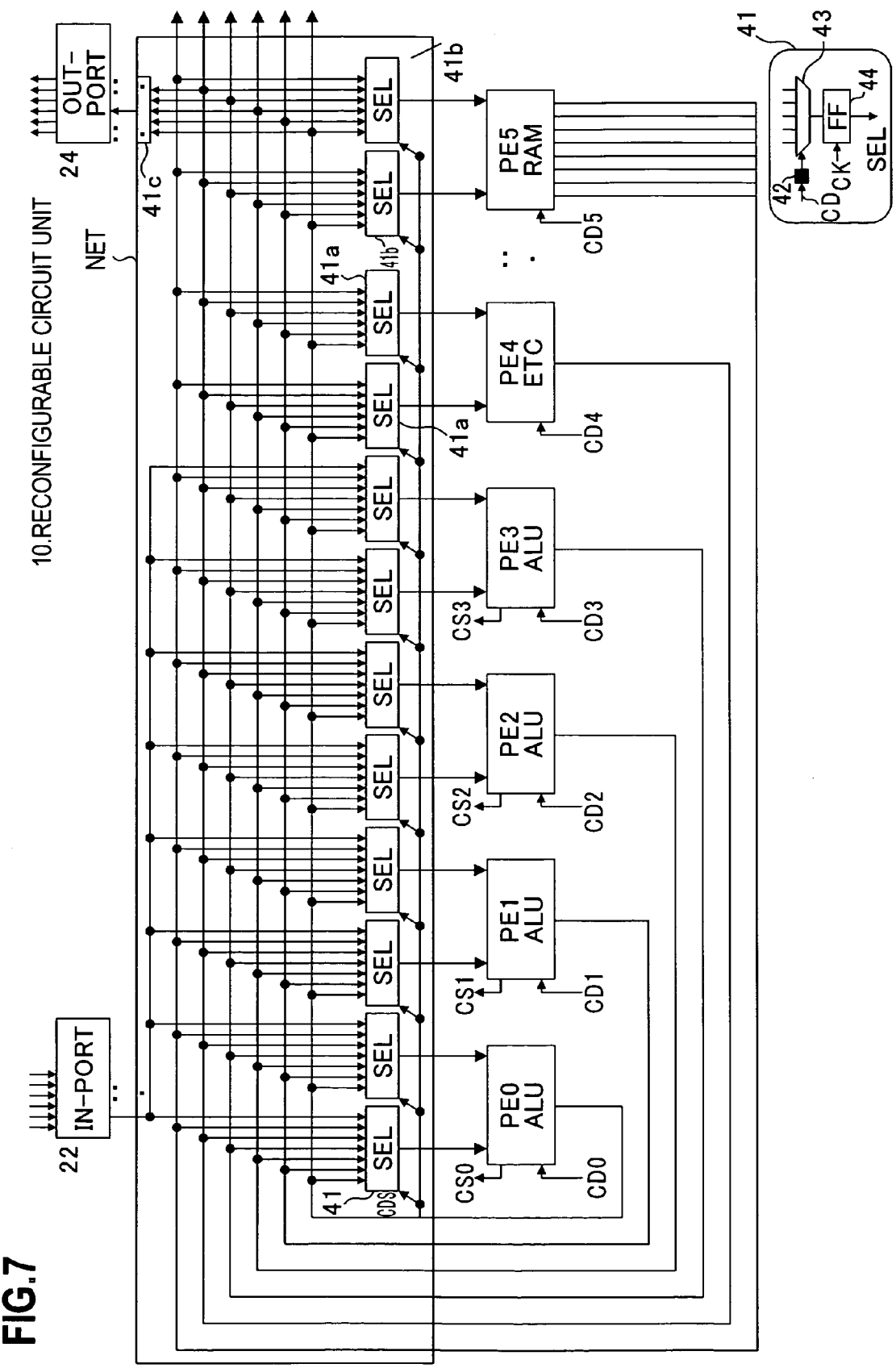
FIG. 7 shows an example of the configuration of a processor element network NET in an embodiment.

FIG. 7 shows an example of the configuration of the processor element network NET in the embodiment. The operation processor elements PE0 to PE3, the memory processor element PE5, and another processor element PE4 are configured so as to be connectable via selectors 41 which are switches in the network NET. Each of the processor elements PE0 to PE5 can be constructed in an arbitrary configuration based on configuration data CD0 to CD5, and the selectors 41 (41a, 41b, 41c) in the network NET also can be constructed in an arbitrary configuration based on the configuration data CDs.

As indicated in an example on the bottom-right of the figure, the selectors 41 comprise a register 42 which stores configuration data CD, a selector circuit 43 which selects the input according to data in the register 42, and a flip-flop 44 which latches the output of the selector circuit 43 in synchronization with the clock CK. The network NET enables desired connections to the data input port 22 and output port 24 via the selector 41.

Figure 8:
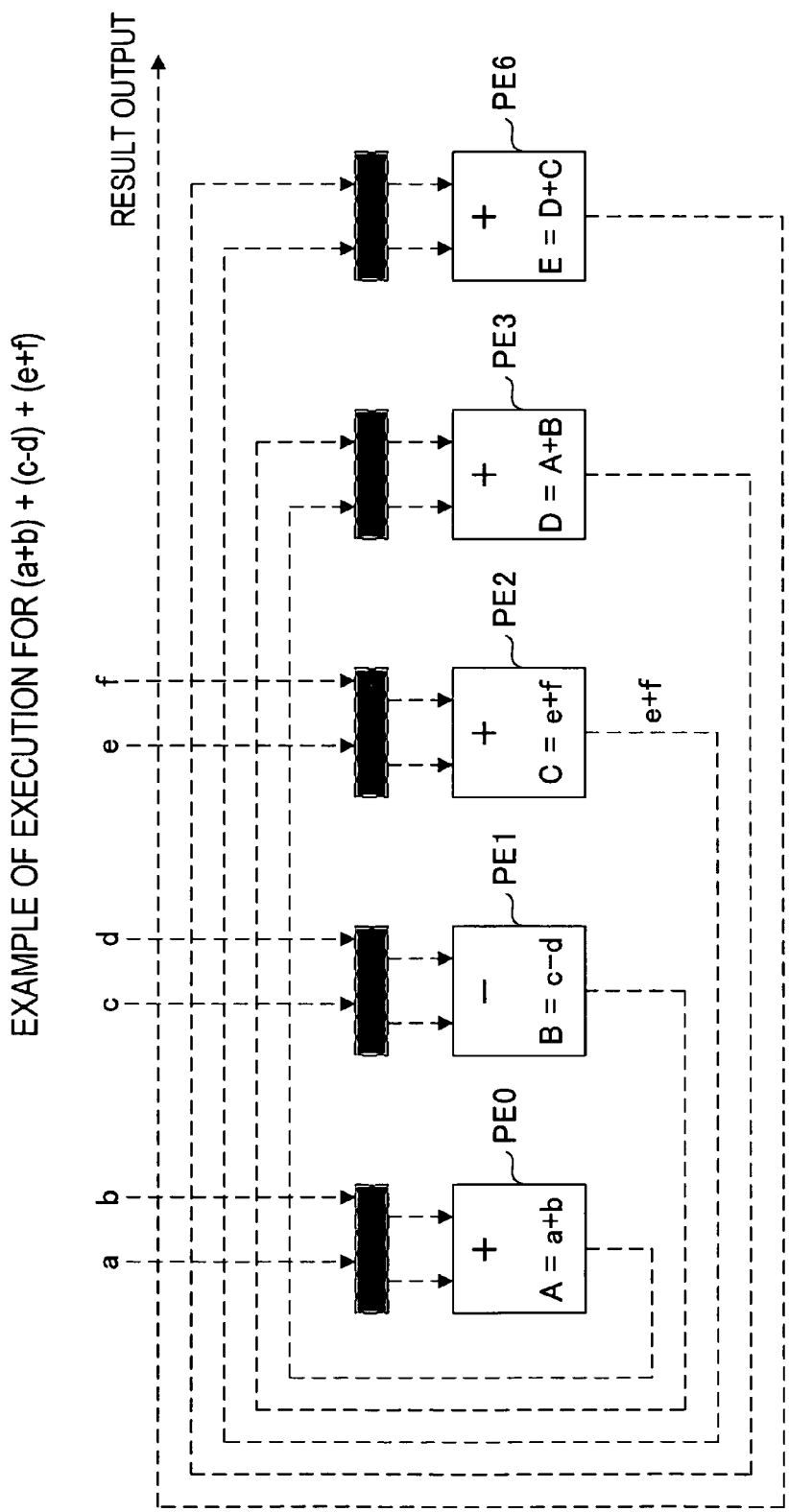
FIG. 8 shows an example of the circuit state constructed using configuration data in normal operation in an embodiment; and, FIG. 9 shows an example of the circuit state constructed using configuration data in normal operation in an embodiment.
Figure 9:
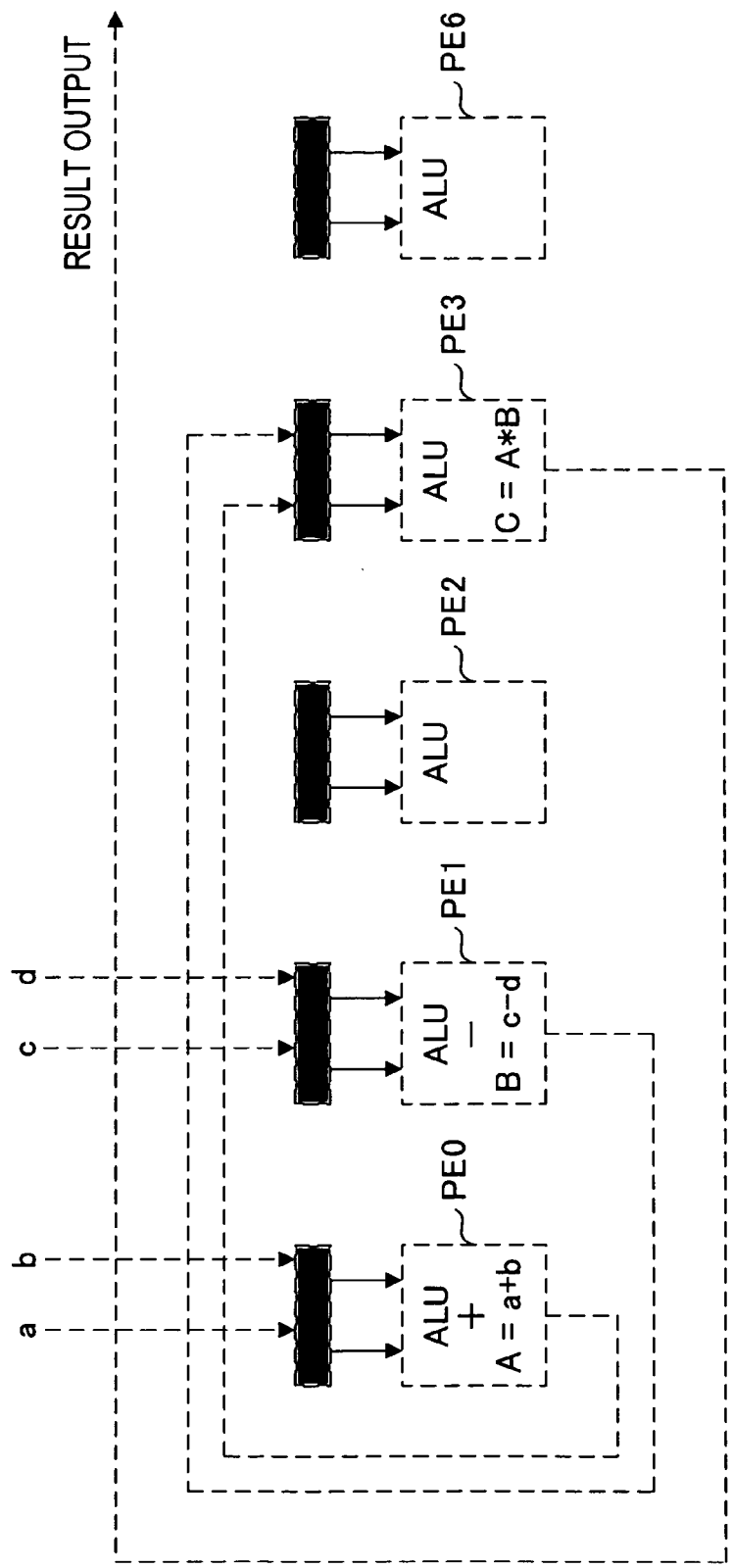

FIG. 8 and FIG. 9 show examples of the circuit state constructed using configuration data in normal operation in this embodiment. In these figures, the operation processor elements PE0 to PE3 and PE6, which can dynamically construct operational circuits, are connected by the network NET to construct a dedicated operational circuit which performs prescribed arithmetic operations at high speed.

The example of FIG. 8 is an example in which a dedicated operational circuit is constructed to execute, for input data a, b, c, d, e, f, the following arithmetic operational expression.

(a+b)+(c−d)+(e+f)

According to this configuration example, the processor element PE0 is constructed as an operational circuit to compute A=a+b, the processor element PE1 is constructed as an operational circuit to compute B=c−d, the processor element PE2 is constructed as an operational circuit to compute C=e+f, the processor element PE3 is constructed as an operational circuit to compute D=A+B, and the processor element PE6 is constructed as an operational circuit to compute E=D+C. Each of the data items a through f is supplied from a memory processor element or similar, not shown, and the output of the processor element PE6 is output to a memory processor element and external equipment as an operation result E.

The processor elements PE0, PE1, PE2 perform operational processing in parallel, and on obtaining the operation results, the processor element PE3 performs an operation to compute D=A+B, and finally the processor element PE6 performs an operation to compute E=D+C. By thus constructing a dedicated operational circuit, parallel operation is enabled, and the efficiency of operation processing can be improved.

Each operation processor element internally incorporates an ALU, adder, multiplier, comparator and similar, and based on configuration data CD can be reconstructed as an arbitrary operational circuit. Through construction as shown in FIG. 8, a dedicated operational circuit which performs only the above arithmetic operation can be constructed. By constructing this dedicated operational circuit, a plurality of arithmetic operations can be executed in parallel, and the efficiency of operations can be improved.

The example of FIG. 9 is an example in which a dedicated operational circuit is constructed which, for input data a through d, executes the arithmetic operation (a+b)*(c+d).

The processor element PE0 is constructed as an operational circuit to compute A=a+b, the processor element PE1 is constructed as an operational circuit to compute B=c−d, the processor element PE3 is constructed as an operational circuit to compute C=A*B, and the operation result C is output to a memory processor element or to an external cluster. In this case also, the processor elements PE0 and PE1 perform operation processing in parallel, and the processor element PE3 performs operation processing to compute C=A*B given the operation results A and B. Hence by constructing this dedicated operational circuit, the operation efficiency can be improved, and large quantities of data can be subjected to arithmetic operations with higher efficiency.

As explained above, in the embodiment, during the initialization period at power-on, the fact that the reconfigurable circuit unit is not constructed in a desired circuit state by the configuration control portion is utilized to construct an initialization circuit necessary for initialization operation, which in the specific example given is an initialization counter circuit. And, during normal operation after the initialization operation, the desired circuit state is constructed within the reconfigurable circuit unit by the configuration control portion. During normal operation, there is no need for the initialization circuit to exist.

In the above embodiments, initialization configuration data is set in the configuration register using the clear terminals and preset terminals of the flip-flops in the register. However, this invention is not limited thereto, and an initialization configuration data generation portion may be provided separately from the configuration control portion, with the initialization configuration generation portion supplying initialization configuration data to the configuration register while supplying a state transition signal, in response to an external reset cancellation signal ERST. That is, if at power-on the initialization data can be automatically latched by the configuration register, an initialization circuit can be similarly constructed within the reconfigurable circuit unit.

What is claimed is:

1. A reconfigurable integrated circuit device, in which an arbitrary operational state is constructed based on configuration data, comprising:
    a reconfigurable circuit unit, having a plurality of reconfigurable processor elements and a processor element network which connects said processor elements in an arbitrary state; and,
    a configuration control portion, which supplies configuration data to said processor elements and processor element network, to configure an arbitrary state in said reconfigurable circuit unit; and wherein
    in response to an external reset cancellation signal at a time of power-on, a state of an initialization circuit is configured in at least a portion of said reconfigurable circuit unit; and,
    in response to an internal reset cancellation signal after completion of operation of said initialization circuit, said configuration control portion starts supplying said configuration data.

2. The reconfigurable integrated circuit device according to claim 1, wherein said reconfigurable circuit unit has a configuration register which captures said configuration data in response to a state transition signal from said configuration control portion, said reconfigurable circuit unit is configured to be said arbitrary state based on the configuration data captured by the configuration register, and, in response to said external reset cancellation signal, said configuration register is initialized to initialization configuration data corresponding to the state of said initialization circuit.

3. The reconfigurable integrated circuit device according to claim 2, wherein said configuration register has a plurality of flip-flops, and said external reset cancellation signal is supplied to clear terminals or to preset terminals of said plurality of flip-flops.

4. The reconfigurable integrated circuit device according to claim 1, wherein
    as said initialization circuit, an initialization counter which counts a prescribed number of the external clocks is configured in said reconfigurable circuit unit;
    said reconfigurable integrated circuit device further comprises a clock generation circuit which generates an internal clock phase-matched to an external clock, and an initialization latch circuit which latches an initialization end signal generated at a time of end of counting of said prescribed count number by said initialization counter; and,
    in response to said initialization end signal latched by said initialization latch circuit, said clock generation circuit starts outputting of the internal clock.

5. The reconfigurable integrated circuit device according to claim 4, wherein said clock generation circuit is a PLL circuit which generates an internal clock phase-matched to said external clock and frequency-divided from said external clock frequency.

6. The reconfigurable integrated circuit device according to claim 4, further comprising an internal reset circuit which generates said internal reset cancellation signal after completion of operation of said initialization circuit, wherein
    said clock generation circuit outputs either said generated internal clock or said external clock according to the latched state of said initialization latch circuit, and said internal reset circuit generates said internal reset cancellation signal when the clock output from said clock generation circuit becomes said internal clock.

7. The reconfigurable integrated circuit device according to claim 4, wherein said initialization counter comprises, at least, a first processor element, in which is configured an addition circuit which cumulatively adds prescribed arguments in response to said external clock, and a second processor element, in which is configured a comparison circuit which detects whether the cumulative value of said addition circuit coincides with a prescribed count end value and outputs said initialization end signal.

8. The reconfigurable integrated circuit device according to claim 1, further comprising an internal reset circuit which generates said internal reset cancellation signal after completion of the operation of said initialization circuit.

9. A reconfigurable integrated circuit device, in which an arbitrary operational state is constructed based on configuration data, comprising:
    a reconfigurable circuit unit, having a plurality of reconfigurable processor elements and a processor element network which connects said processor elements in an arbitrary state;
    a configuration control portion, which supplies configuration data to said processor elements and processor element network, to configure an arbitrary state in said reconfigurable circuit unit; and,
    a clock generation circuit, which generates an internal clock phase-matched to an external clock; and wherein in response to an external reset cancellation signal at a time of power-on, an initialization circuit is configured in at least a portion of said reconfigurable circuit unit;

in response to an internal reset cancellation signal after completion of operation of said initialization circuit, said configuration control portion starts supplying said configuration data; and, said initialization circuit comprises a stabilization measurement circuit which measures a prescribed time up to stabilization of clock generation by said clock generation circuit.

* * * * *